United States Patent [19]
Moreno

[11] 3,823,270
[45] July 9, 1974

[54] TRUNKING ARRANGEMENT FOR MULTIPLE EXCHANGE SWITCHING SYSTEM

[75] Inventor: Miguel Fernandez Moreno, Madrid, Spain

[73] Assignee: International Standard Electric Corporation, New York, N.Y.

[22] Filed: Aug. 9, 1972

[21] Appl. No.: 279,178

[52] U.S. Cl. .......... 179/18 EA
[51] Int. Cl. .......... H04q 3/58
[58] Field of Search .......... 179/18 EA

[56] References Cited

UNITED STATES PATENTS 3,529,094 9/1970 Erwin et al. .......... 179/18 EA
3,566,041 2/1971 Ekberg .......... 179/18 EA

*Primary Examiner*—William C. Cooper
*Attorney, Agent, or Firm*—J. B. Raden; D. P. Warner

[57] ABSTRACT

Trunking arrangement in which a direct path from a primary selector to a secondary selector is attempted. If no free paths are available, a path is completed to a support primary section to find an available path from the support primary to an available secondary. If no path can be found in this second try, a path is attempted from the support primary to support secondaries, the support secondaries being across split verticals in selector switches from the regular secondaries. If no path can be found an alternate route is attempted as if it were the original path attempted.

3 Claims, 10 Drawing Figures

TRUNKING ARRANGEMENT FOR MULTIPLE EXCHANGE SWITCHING SYSTEM

The present invention concerns a switching arrangement to increase, in an economical and easy way the trunk capacity and the capability for handling calls in automatic switching systems for communications. This invention relates particularly to improvements in telephone switching systems and to the achievement of efficient and economic solutions in the planning and construction of communication networks.

This invention has special applications in rural automatic telephone exchanges, although this does not imply any limitations in other fields.

As an example, we will refer to rural telephone switching systems and, particularly, to the "cross-bar" type rural exchanges.

Those rural telephone networks are normally planned as follows:

There is a group of exchanges with a very small traffic capacity, which we shall call "satellite exchanges" (C SAT FIG. 1), which are essentially subordinate to another exchange in the geographical area in which they are located.

There is a second type of exchange with a larger traffic capacity, which we shall call "terminal" or "sector" exchanges (CT and CS, FIG. 1), according to their function.

The terminal, sector and satellite exchanges form the rural network, and have clearly differentiated features from several points of view.

The terminal exchanges handle the traffic between local subscribers and the traffic towards the corresponding sector exchange.

The sector exchanges must handle much of the transit traffic between terminal and satellite exchanges in their own sector, as well as the traffic from outside the sector, and traffic to the sector. Therefore, the traffic handling capacity of the sector exchanges and their trunk capacity must be much greater than that of the terminal exchanges.

Present-day rural exchanges of the two-stage variety cause limitations for the planning and establishment of rural sectors.

Figure 1:
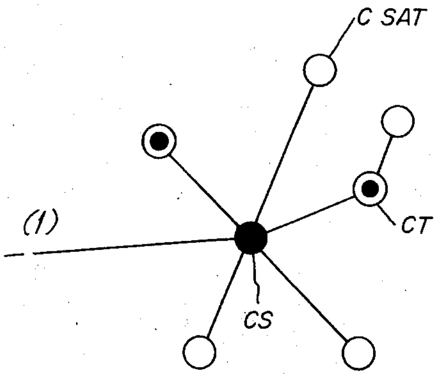
Figure 2:
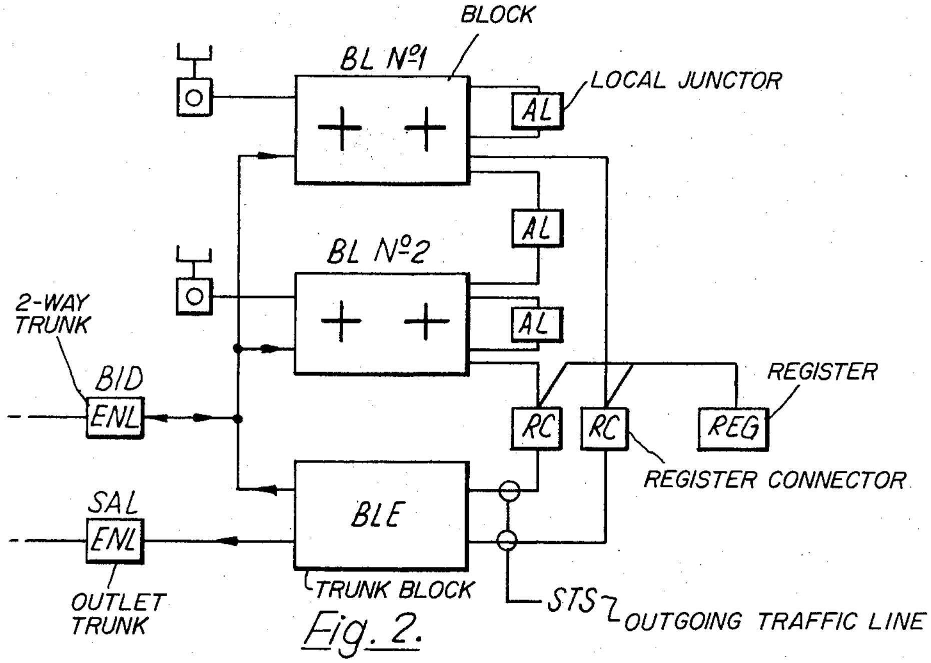
Figure 3:
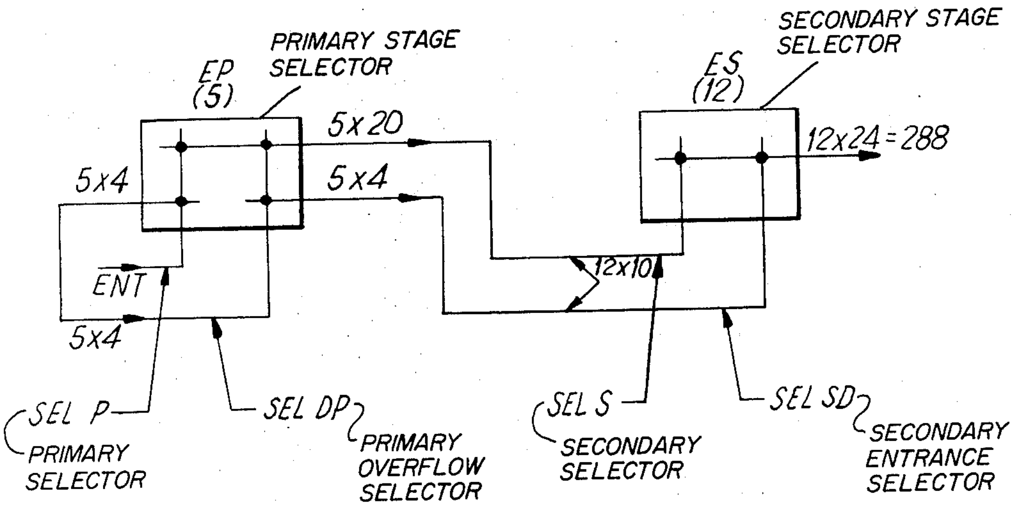
Figure 4:
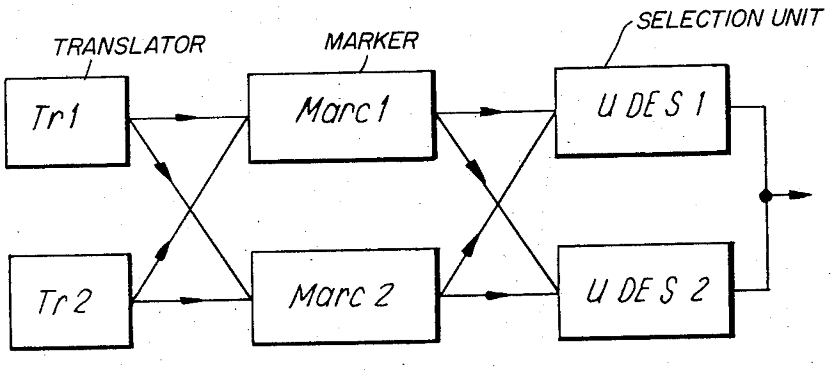
Figure 5:
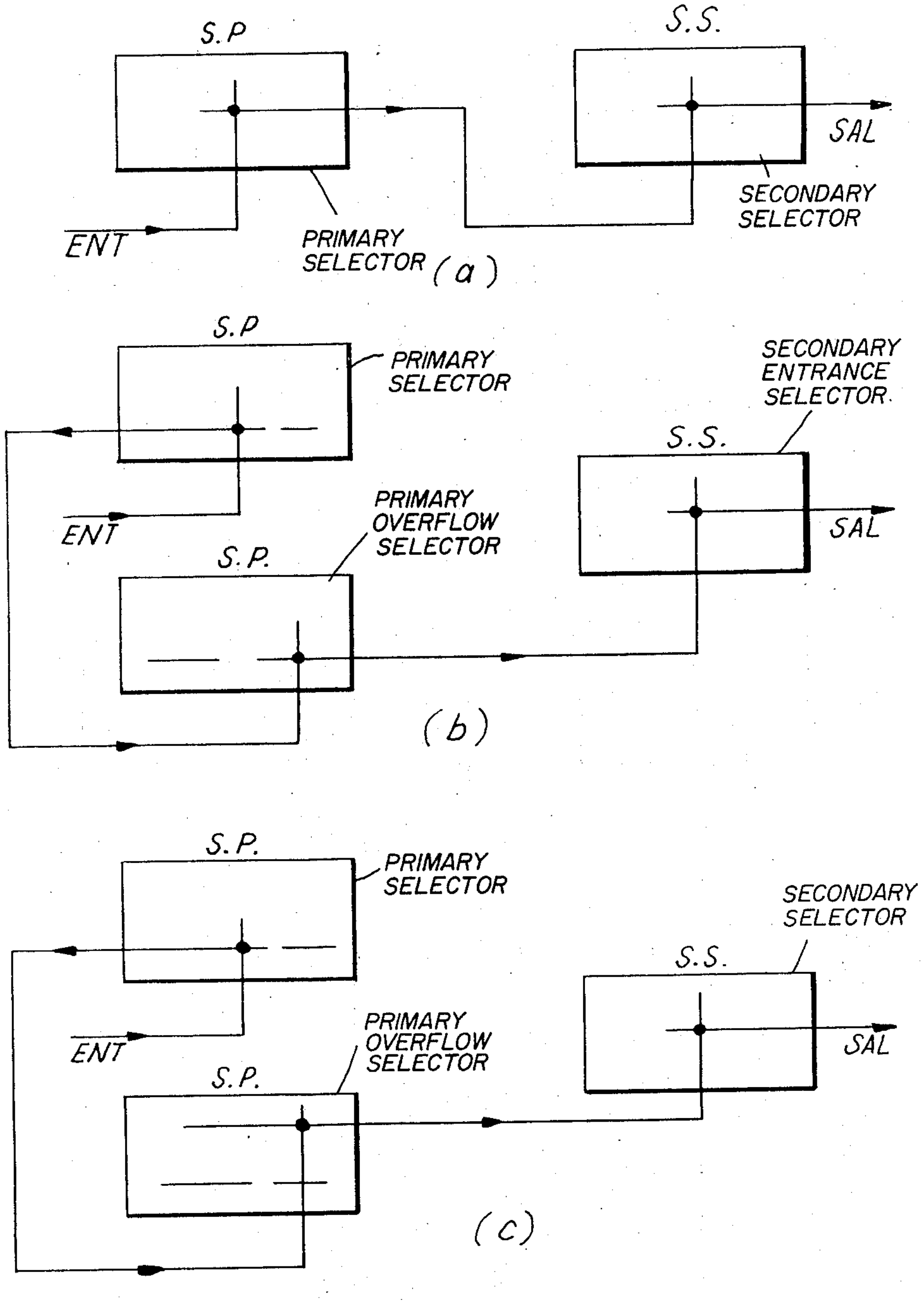
Figure 6:
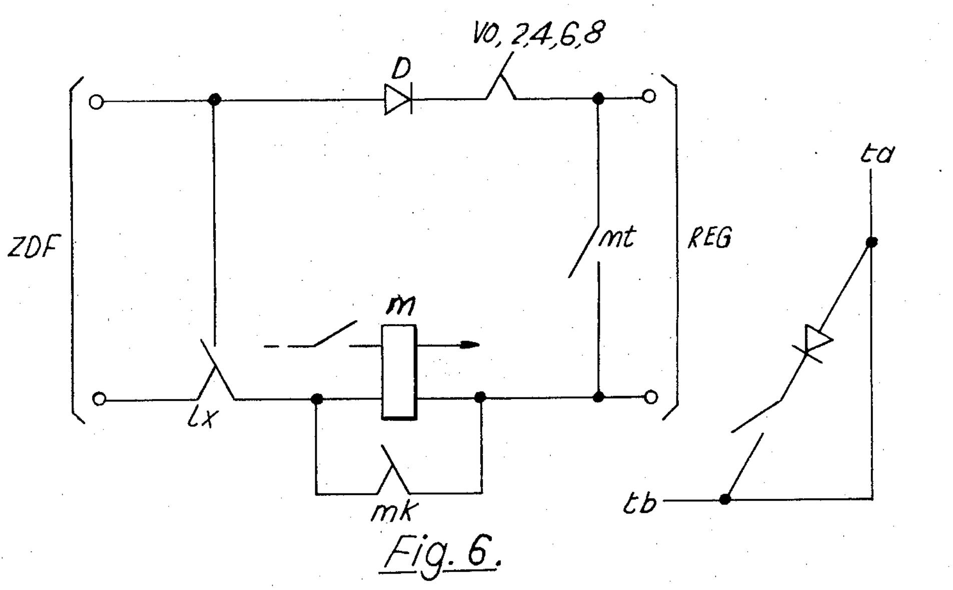
Figure 7:
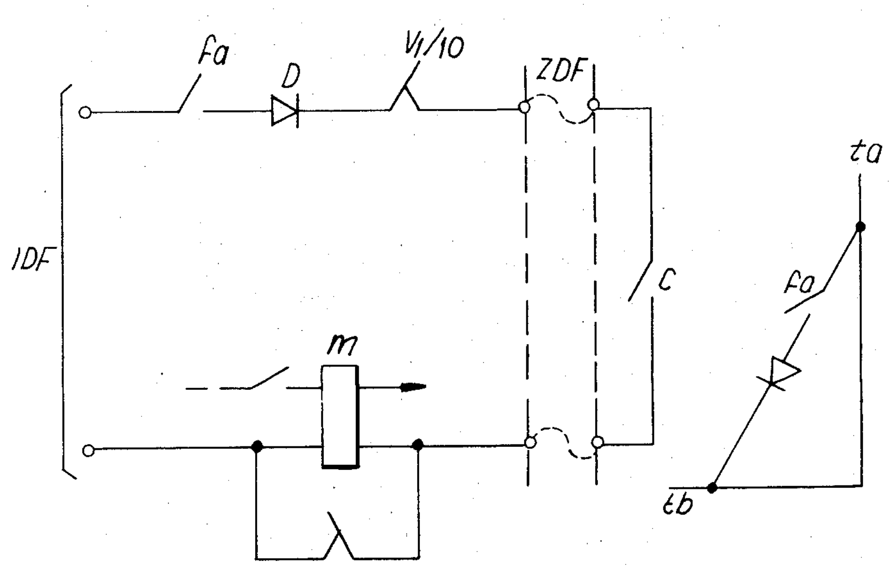
Figure 8:
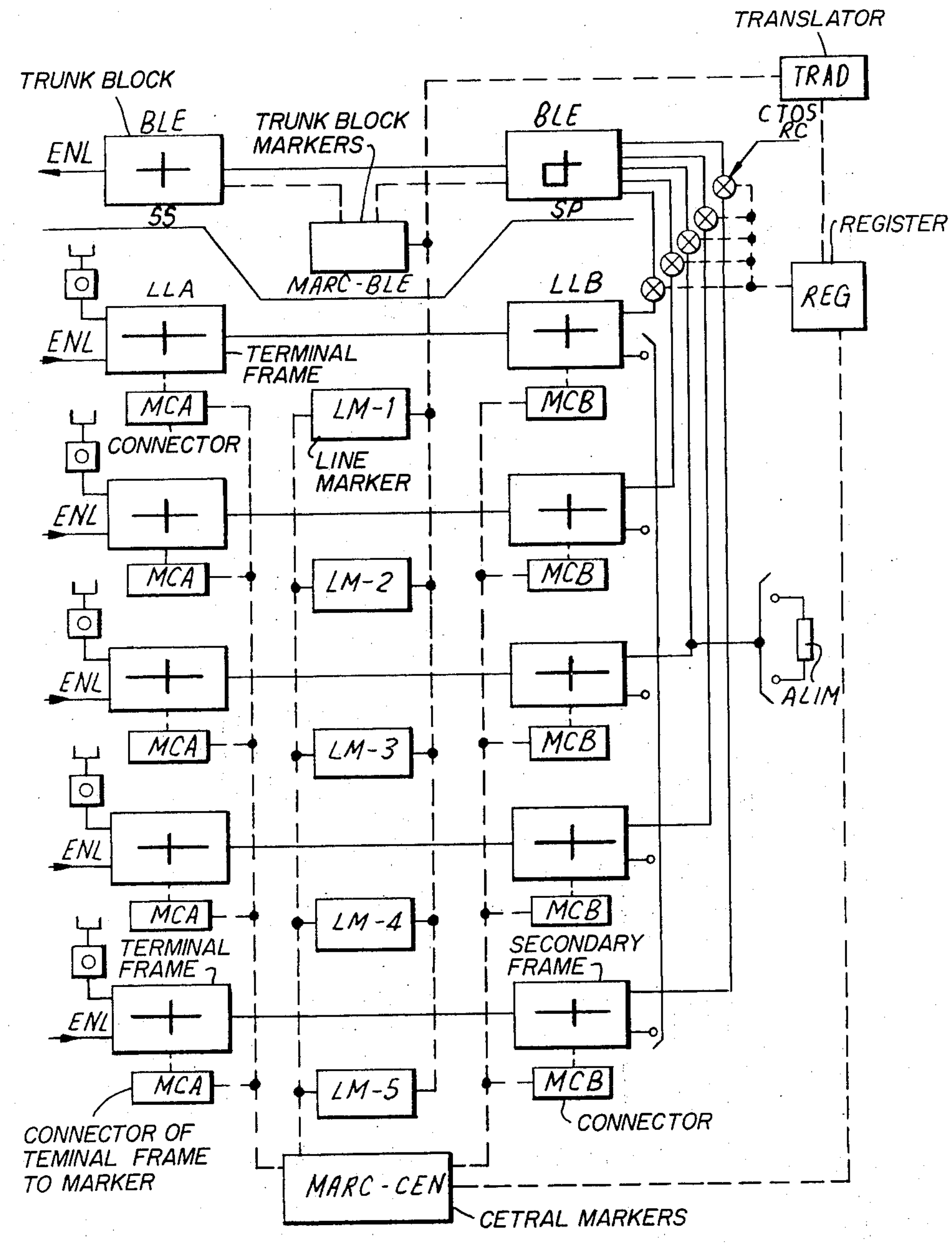

The present invention is intended chiefly to be applied to sector exchanges (or their equivalent) and its aim is to increase the trunk capacity of exchanges, together with their traffic and call handling capacity in a more economic way than has been known hitherto within the line of rural cross-bar switching systems, thus achieving more efficient and economical solutions in its application to the planning and structural organization of rural networks. The above mentioned and other features and objects of this invention and the manner of obtaining them will become more apparent, and the invention itself will be best understood by reference to the following description of an embodiment of the invention taken in conjunction with the accompanying drawings, in which:

FIG. 1 illustrates a number of terminal and satellite exchanges forming a network with a sector exchange, FIG. 2 is a block diagram illustrating the interconnection of a trunk block with a telephone exchange, FIG. 3 is a block diagram illustrating relationships between selector stages employed in the trunk block of FIG. 2, FIG. 4 is a block diagram showing interrelationships between markers, translators and selection units grouped in a trunk block, FIGS. 5*a*, 5*b* and 5*c* show connections made during successive attempts to route signals through primary and secondary selectors, FIG. 6 illustrates a feed junctor testing circuit, FIG. 7 illustrates a testing circuit for register connecting circuits, and FIG. 8 shows how a trunk block may be connected in a cross-bar exchange.

According to a preferred embodiment, objects of the invention are achieved by a more advanced means of internal routing of calls and the use of a special functional unit which we shall call a "Trunk block."

This new functional unit has made it necessary to create:

1. A procedure for connection to the rest of the exchange equipment by means of a device which we shall call a "superimposed matrix."

2. A new link configuration of great efficiency.

3. A new control unit with special features, which we shall call "markers."

One of the main characteristics of the trunk block is the ease with which it can be incorporated with existing exchanges, even those which have already been installed and are in operation, with very few equipment modifications. This has been achieved by means of the special connection procedure (superimposed matrix). From this point onwards, the trunk block forms an independent module in the exchanges, as shown in FIG. 2, and it is composed of a speech network and a control unit.

The meanings of the abbreviations used in FIG. 2 are as follows:

BL — Block
AL — Local junctor
RC — Register connector
REG — Register
ENL — Trunk
SAL — Outlet
BID — Two-way trunk
STS — Outgoing traffic only
BLE — Trunk block.

With respect to the speech network the trunk block includes one or two selection units. Each selection unit includes a link system for two stages of selectors: a primary stage and a secondary stage.

The special arrangement of this link system, which is shown in FIG. 3, provides the functional unit with the necessary traffic capacity for the use to which it is put.

The abbreviations used in FIG. 3 have the following meanings:

EP — Primary stage
ES — Secondary stage
SELP — Primary selectors
SELDP — Primary overflow selectors
SELS — Secondary selectors
SELSD — Secondary entrance selectors.

The multiswitch is the same used for the rest of the exchange equipment and the efficiency achieved for the cross point is much higher than has been obtained hitherto. The control unit consists of two markers (FIG. 4) operating alternately with a single set of marking relays.

These markers, unlike those used in other cross-bar systems, control by themselves one or two of the above-mentioned selection units.

The interconnection of markers, translators, and selection units is shown in FIG. 4.

The use of two markers in the case of a single selection unit is justified for reasons of reliability, while the capacity of the ensemble to handle calls is enough to operate with the two selection units.

The abbreviations in FIG. 4 have the following meanings:

TR1 — Translator 1
TR2 — Translator 2
MARC1 — Marker 1
MARC2 — Marker 2
U DE S1 — Selection unit 1
U DE S2 — Selection unit 2.

As an example, a detailed description of a possible version of the trunk block is given below.

The speech network, as has already been said, is formed by one or two selection units.

Each selection unit comprises two stages of selectors: a primary stage (EP) and a secondary stage (ES) (see FIG. 3) the multiselector used to build-up the link system of these selection units has 10 vertical selectors and seven horizontal bars, the latter being used for breakdown purposes, which achieves 24 levels.

The primary stage is divided into five sections, each including a variable number of vertical selectors as well as four primary mutual support selectors.

The secondary stage is divided into 12 sections (one multiselector frame per section) leading to 24×12 = 288 outlets.

Each secondary section includes 10 vertical selectors (secondary and secondary mutual support selectors).

Each primary section has access to any secondary section through two links. Therefore, the total number of direct links is 20×5 = 100, and the total number of secondary mutual support links is 4×5 = 20. Each primary section has access to the other four primary sections through the four primary mutual support.

In a first routing attempt (a) two selectors are used for the connection between one input and one outlet, one primary selector and one secondary selector.

In a second routing attempt (b) three selectors are used: one primary selector, one primary mutual support selector (or primary overflow selector) and one secondary mutual support selector (or secondary entrance selector).

In a third routing attempt (c) three selectors are operated: one primary selector, one primary mutual support selector (or one primary overflow selector) and one secondary selector (see FIG. 5).

The abbreviations used in this figure have the following meanings:

SP — Primary selector
SS — Secondary selector
ENT — Input
SAL — Outlet

To determine the traffic capacity of these selection units, the values of internal congestion have been obtained by calculations and simulations performed by computers using appropriate programs. The results obtained indicate a high optimum of link load, for which internal blocking is negligible.

The control unit consists of two markers (shown in FIG. 4) operating on an alternate basis with a single set of marking relays.

These two markers control one or two selection units like those described above.

The interconnection with translators and selection units is shown in FIG. 4.

The use of two markers when there is only one selection unit is justified for the sake of reliability while the capacity of the set to handle calls is sufficient to work with two selection units.

In an originated call, the control unit (MARC 1 and MARC 2) carries out the necessary tests and selections to connect the calling subscriber on the incoming trunk to an idle (local) feed junctor with access to an idle register.

By using this new unit, the seizure of the register will be made via the new register connector circuit instead of the local junctor. A new procedure has been developed in order to make the test and selection of these new circuits with the existing control units, by means of a diode matrix superimposed on those already existing for the local feed junctors.

FIG. 6 shows the junctor testing circuit. Since these feed junctors, in this case, will not have access to registers, they can be seized one by one by operation of the *mt* relay in local selection.

On the other hand, the new register connecting circuits have a testing circuit similar to that of the feed junctors. (See FIGS. 6 and 7; FIG. 6 corresponds to the feed junctor testing circuit and FIG. 7 to the testing circuit of register connecting circuits.)

These circuits must only be seized in originated calls for which its relay *fa* will be activated, but not the *mt* relay of the feed junctors in this case.

As already seen, the feed junctor circuits have access to registers that are connected to the calling subscriber (or incoming trunk) through the former in originated calls.

The register having been connected, it will receive and store either the digits dialled by the subscriber or those from another exchange.

When the register has received a sufficient number of digits to enable it to analyze the type of call, it seizes the translator (FIG. 4) and transfers them to it. The translator analyzes the information received and determines, among other things, whether the call must be ended locally or whether it must be routed towards another exchange. In this latter case, it seizes one of the markers of the trunk block, to which it transmits the outgoing route code, the tariff code to be applied, if any, and even permission to take an alternate route.

Marker seizure is carried out in accordance with the following rules:

1. Only one of the two markers of the trunk unit (in the event of both being free) is able to accept a call. As soon as the call has been accepted, the marker concerned transfers the referred ability to the other marker, thus achieving a perfect distribution of calls between them.

2. Each marker is able to accept one of the two possible simultaneous calls that the two translators can offer it.

Reception of the aforesaid route and tariff codes takes place in the marker as follows:

Route code (2 out of 7). . . capacity for 21 routes
Tariff code (2 out of 5). . . capacity for 10 tariffs.

Any other code could be arranged.

The information received is not enough for the internal routing of the call, as it is necessary to have available the input position that the register connecting circuit occupies in the trunk block. This information is obtained by means of a dialling operation carried out by the marker through the register translator and the register connecting circuit involved in the call, after connection to the register itself. Information is thus obtained about the following:

1. To which of the two possible units the register connecting circuit belongs.
2. Primary Section of this unit.
3. Multiselector frame.

This supplementary data enables the marker to route the call appropriately.

Next, by means of the marking relays, the marker determines the secondary sections to which junctors of the required route are connected, and which are moreover, idle.

Once these secondary sections have been determined, the marker analyzes the status of the internal direct links to see whether there is a free link between the primary section to which the register connecting circuit that carries this call belongs and any of the secondary sections with a free trunk on the required route.

If so, it determines the previously mentioned secondary sections, but, moreover, those which verify the referred access, and it proceeds to select one of them.

After this selection, on the one hand, a junctor is chosen out of the possible valid junctors connected to the secondary section selected; and, simultaneously a link is chosen out of the two possible, free internal links that join the primary section to the secondary section in question and the horizontal bars of both sections are positioned.

After completing this operation, a connection order is issued to the respective vertical selectors and the register connecting circuit and the selected outgoing traffic line will thus have been linked.

At the same time, if the call requires billing, the marker will be connected to the chosen junctor, to which it transfers the information on the tariff to be applied during the call.

If, after the internal direct links have been analyzed, it is observed that none is available between the primary section to which the register connecting circuit is connected and those secondary sections with idle junctors on the required route, it will be determined which of the primary sections, other than the one referred to previously, has access to those secondary sections through the secondary mutual support links (to one of them at least) and also has access to the primary section of the register connecting circuit through the internal links between primary sections (primary mutual support).

One primary section will be chosen from those that comply with this double condition.

Starting from the chosen primary section, the secondary sections to which the former has access will be determined out of those that had a free junctor on the desired route, and one of them is chosen.

Under these conditions, as in the previous case, a choice of junctor is made within the selected secondary section. (The link between primary and secondary sections, as well as the link between primary sections, is the only one that exists as is properly determined by knowing the corresponding sections.)

As in the previous case, the horizontal bars of all the multiselector frames involved are placed in position and the vertical selectors are activated and metering is carried out if applicable.

Lastly, if this second analysis proves fruitless, a third one is attempted similar to the previous one, but observing the availability status of the direct links between the mutual support primary section and the secondary sections. The procedure to be followed is similar to that previously described.

If, when determining the secondary sections with a free junctor on the required route, it is observed that there are none, this will indicate that all junctors on that route are unavailable (either seized or out of commission) and we are thus confronted with the state called external congestion.

On the other hand, if there are secondary sections with a free junctor and yet a path cannot be found by means of any of the three attempts described, we shall be confronted with a state of internal congestion.

In either event (external or internal congestion) the marker can attempt to route the call towards an alternative route, provided that it has received the necessary permission from the translator. Otherwise, it will release, resetting the call.

If it obtains permission, it will start the described attempts anew, this time towards the junctors of the new route just as if it were the original route.

FIG. 8 shows how the trunk block BLE is connected in a cross-bar exchange of the rural type equipped with five blocks.

The meanings of the abbreviations in FIG. 8 are as follows:

ENL — Trunks
BLE — Trunk Block
SS — Secondary Section
SPS — Primary Section
MARC-BLE— Trunk Blocks Markers
MCA — Connector of Terminal Frame to Central Marker
ML — Line marker
LLA — Terminal frame
LLB — Secondary frame
MCB — Connector of Secondary Frame to Central Marker.
TRAD — Translator
RES — Register
AL — Feed junctor
CTOS - RC — Register Connecting Circuits
MARC - CEN — Central Markers.

I claim:

1. A trunking arrangement for a multiple exchange telecommunications system comprising a trunk path completing circuit for increasing the trunking capacity of one exchange in said system, said circuit including a first and a second marker circuit and a plurality of selection units, each of said marker circuits including means for controlling paths through the selection units in said one exchange, each selection unit including a primary selector stage, and a secondary selector stage, each primary selector stage including a primary selector and an overflow selector, each secondary selector stage including a secondary selector and a secondary overflow selector, means for routing a path from a primary selector stage to a secondary selector stage and, in the event of failure to complete a route path from the primary selector directly to the secondary selector, for attempting a second route from said primary selector through an overflow selector to the secondary overflow selector.

2. An arrangement as claimed in claim 1, wherein there are means for completing access to said trunk completing circuit, said completing means including a diode matrix discriminating between access to said marker originating from outside said exchange or from inside said exchange.

3. An arrangement as claimed in claim 1, wherein said marker circuit attempts to complete a third route from said primary selector through an overflow selector to the secondary selector in the event of failure of said second route attempt.

* * * * *